United States Patent [19]

Brown

[11] 4,209,837

[45] Jun. 24, 1980

[54] PROGRAMMABLE CONTROLLER

[75] Inventor: James R. Brown, Garden Grove, Calif.

[73] Assignee: Beckman Instruments, Inc., Fullerton, Calif.

[21] Appl. No.: 921,538

[22] Filed: Jul. 3, 1978

[51] Int. Cl.² ............................................. G06G 7/66
[52] U.S. Cl. ..................................... 364/117; 307/41; 307/141.4; 307/350; 364/557
[58] Field of Search ............... 364/104, 118, 100, 117, 364/556, 557, 551; 219/486; 307/32, 38, 41, 139, 141, 141.4, 141.8, 11, 15, 203, 239, 240, 242, 350, 362; 340/147 C, 147 CV, 309.4; 328/146, 150; 236/46 R

[56] References Cited

U.S. PATENT DOCUMENTS

| 3,790,815 | 2/1974 | Karklys | 364/104 X |
| 3,922,527 | 11/1975 | Witkin et al. | 364/118 X |
| 3,984,699 | 10/1976 | Bailey | 364/118 X |
| 3,988,595 | 10/1976 | Eatock | 307/362 X |

Primary Examiner—Joseph F. Ruggiero
Attorney, Agent, or Firm—R. J. Steinmeyer; Robert R. Meads; John R. Shewmaker

[57] ABSTRACT

There is disclosed a circuit for generating an error voltage which is proportional to the difference between a desired value of a physical parameter and the actual value of the physical parameter. The circuit operates by alternately switching the current from a source through a fixed reference resistor and a variable resistor, the resistance value of which changes as a function of the physical parameter to be controlled. The current is switched between the two resistors so that the average voltage generated across the variable resistor would be equal to the average voltage generated across the fixed resistor if the physical parameter had the desired value. By determining the difference between the average voltages across the resistors, the error voltage can be generated for controlling the physical parameter.

9 Claims, 2 Drawing Figures

PROGRAMMABLE CONTROLLER

BACKGROUND OF THE INVENTION

1. Field of the Invention

The present invention relates to a programmable controller and, more particularly, to an inexpensive control circuit which may be utilized to control a physical parameter and which may be programmed for a desired value of the parameter by digital signals, which circuit requires no initial or subsequent calibration or adjustment.

2. Description of the Prior Art

In a wide variety of different types of scientific instruments, machines, and the like, there is a physical parameter which must be controlled rather accurately in order for the instrument or machine to operate as intended. One example of a common physical parameter that often must be controlled is temperature since many scientific and clinical instruments, machines, and devices must operate at a selected temperature. There is such a large number of different physical parameters that must be controlled under different circumstances that even a partial listing would be excessively long. In any event, and by way of example only, some of the more common physical parameters are light intensity, strain, position, dimensions, and the like.

When providing a control circuit for controlling a physical parameter, several requirements are usually present, but very often one or more of these requirements are not met. It is usually desirable that the control circuit be simple and inexpensive. It would be highly desirable if the circuit did not require initial or subsequent calibration or adjustment. This latter requirement is most often not fulfilled with the result being that additional circuitry is required for calibration and operator time must be taken for adjustment.

Today's instrument designs typically incorporate microprocessors and other digital circuitry. This being the case, it would be highly desirable if the control circuit were digitally programmable. This would permit the microprocessor or other digital circuitry to identify the desired value of the physical parameter and the circuit could be signaled automatically to change the actual value until the desired value is achieved. A simple, low cost, digitally programmable controller which is free from manual calibration at the time of manufacture and during the life of the controller has been unavailable heretofore.

SUMMARY OF THE INVENTION

According to the present invention, there is provided a simple and inexpensive controller which may be utilized to control any physical parameter which can be related to a resistance value. For example, the present control circuit is useable for controlling temperature since the resistance value or a thermistor changes as a function of temperature. In the case of position of dimensions, the present control circuit can also be used since the arm of a variable potentiometer may be physically connected to the element whose size or position is being controlled. Similar situations exist where the variable resistor is light sensitive, strain sensitive, etc. In any of these situations, the present controller may be utilized to generate an error signal proportional to the difference between a desired value of the physical parameter and the actual value of the physical parameter. The present controller does not require initial or subsequent calibration or adjustment and this is true during initial manufacture as well as during the life thereof. Of particular importance in today's instrument designs incorporating microprocessors and other digital circuitry, the present controller is digitally programmable. That is, the controller may be easily programmed by presenting a multiple digit BCD code to the input thereof.

Briefly, the present programmable controller comprises a fixed reference resistor, a variable resistor, the resistance value of which changes as a function of a physical parameter to be controlled, a source of current, means for switching the current alternately through the fixed and variable resistors, means for controlling the switching means to adjust the relative times the current is conducted through the resistors, the relative times being a function of the desired value of the physical parameter, and means for determining the difference between the average voltages across the resistors and for generating a control signal proportional thereto for controlling the value of the physical parameter. In operation, the controlling means controls the switching means so that the average voltage generated across the variable resistor will be equal to the average voltage generated across the fixed resistor if the physical parameter has the desired value. As a result, the control signal is proportional to the difference between the desired value of the physical parameter and the actual value thereof.

It is therefore an object of the present invention to provide a programmable controller.

It is a further object of the present invention to provide a simple and inexpensive controller.

It is a still further object of the present invention to provide a control circuit which requires no initial or subsequent calibration or adjustment.

It is another object of the present invention to provide a controller which may be programmed for a desired operation by digital signals from a computer or other digital circuitry.

It is still another object of the present invention to provide a programmable controller useful in a wide variety of applications.

Still other objects, features, and attendant advantages of the present invention will become apparent to those skilled in the art from a reading of the following detailed description of the preferred embodiment constructed in accordance therewith, taken in conjunction with the accompanying drawings wherein:

DESCRIPTION OF THE PREFERRED EMBODIMENT

Figure 1:
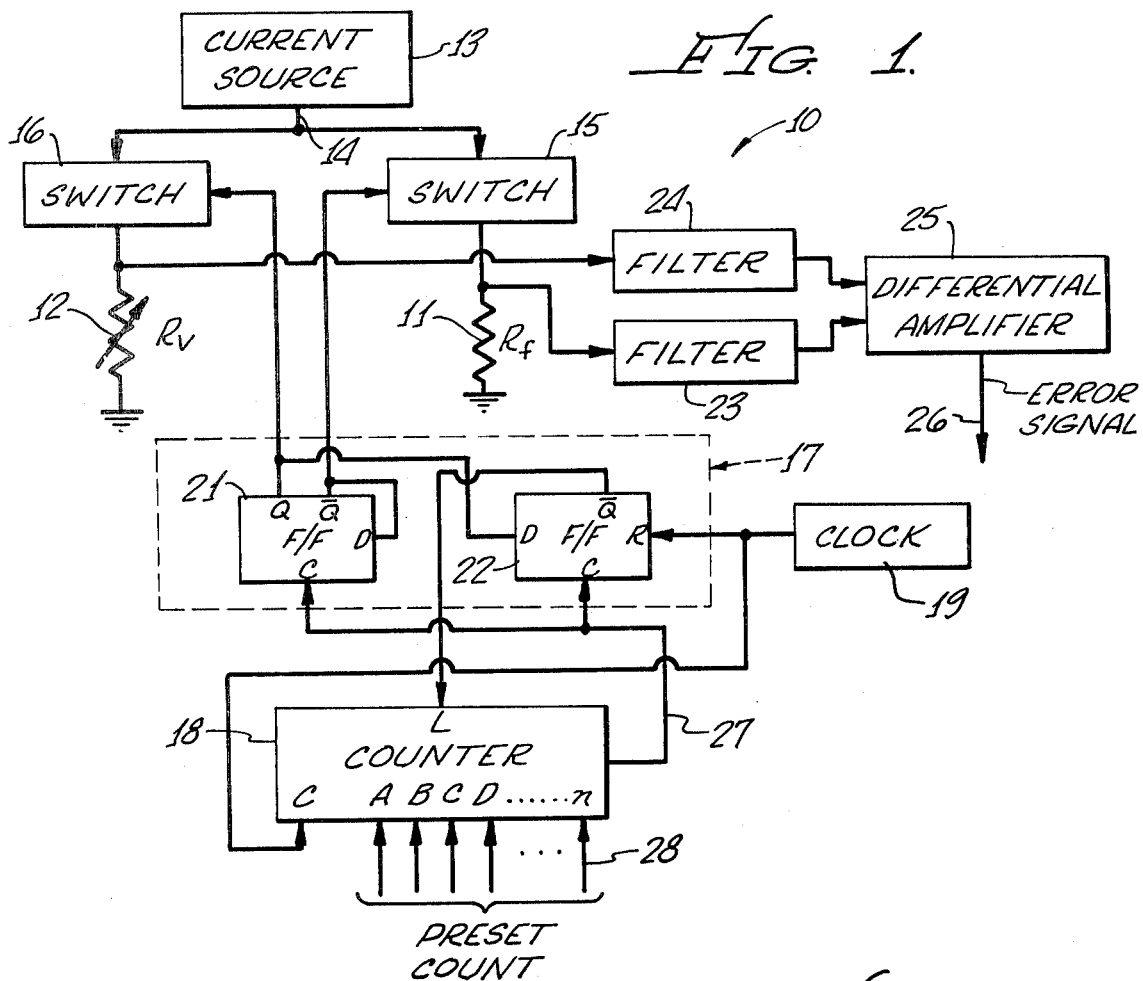
FIG. 1 is a block diagram of a programmable controller constructed in accordance with the teachings of the present invention.

Referring now to the drawings and, more particularly, to FIG. 1 thereof, there is shown a programmable controller, generally designated 10, which satisfies the need for an inexpensive control circuit which may be programmed for a desired value of a physical parameter by digital signals and which requires no initial or subsequent calibration or adjustment. Controller 10 includes a fixed reference resistor 11, also designated $R_f$, and a variable resistor 12, also designated $R_v$. Reference resistor 11 is preferably a high precision resistor whose accuracy is a function of the desired accuracy with which control circuit 10 controls a physical parameter. By way of example, resistor 11 may be a 1,000 ohm resistor having an accuracy of 0.1%.

Variable resistor 12 may be any resistive transducer, the resistance value of which changes as a function of a physical parameter to be controlled by controller 10. Thus, if the physical parameter to be controlled is temperature, resistor 12 may be a thermistor whose resistance versus temperature characteristics are known. The variation of resistance with temperature of resistor 12 would have the same precision as that encountered with resistor 11. Alternatively, resistor 12 could be a potentiometer, the arm of which is connected to an object for sensing movement thereof. Resistor 12 could be a strain gauge, a light sensitive resistor, or the like.

Controller 10 includes a current source 13 which provides, on a line 14, a given current value. Current source 13 may be a very simple single transistor current source producing any desired current level on line 14 and it is even permissible that the current value drift. The only requirement for current source 13 is that it be relatively stable and that changes in current not occur rapidly.

The current on line 14 from source 13 is applied by identical switches 15 and 16 to first ends of resistors 11 and 12, respectively, the other ends of which are connected to ground. Switching logic, generally designated 17, controls switches 15 and 16 so that the current from source 13 is alternately conducted through resistors 11 and 12. Switching logic 17 is responsive to the output of a programmable counter 18 which is driven by a clock 19.

Switches 15 and 16 may be relatively inexpensive analog switches and switching logic 17 may simply consist of a pair of D-type flip-flops 21 and 22. Counter 18 may be any conventional type of digital counter preferably responsive to a BCD code. Clock 19 may be a crystal-controlled clock operating, for example, at a frequency of 2 MHz. There is no requirement that the output frequency of clock 19 not vary, the only requirement being that it not vary rapidly.

As switches 15 and 16 are alternately closed, connecting source 13 to resistors 11 and 12, respectively, voltage pulses will result across resistors 11 and 12. These voltage pulses are applied to filters 23 and 24 which filter the high frequencies to provide average voltages at the outputs thereof. The average voltage outputs of filters 23 and 24 are applied to a differential amplifier 25 which produces, on an output line 26, an output voltage proportional to the difference between the average voltages generated across resistors 11 and 12.

Control circuit 10 operates by digitally adjusting the relative times the current from source 13 is conducted through resistors 11 and 12 such that the average voltage generated across resistor 12 will be the same as the average voltage generated across resistor 11 if the ratio of resistance 12 to resistance 11 is the same as the programmed switching cycle. To illustrate, suppose that resistor 12 is a thermistor and at a desired temperature which thermistor 12 is monitoring, the resistance of thermistor 12 is twice that of resistor 11. If current source 13 is rapidly switched back and forth between resistors 11 and 12, spending twice as much time connected to resistor 11 as to resistor 12, then the average voltage across both resistors will be the same. Any temperature change at thermistor 12 will alter its resistance and, as a consequence, the average voltage thereacross will also change. This change will result in an error signal at the output of amplifier 25.

Current switching is preferably controlled by digital circuitry so that controller 10 may be adjusted by a microprocessor or other digital circuitry. Switching logic 17, counter 18, and clock 19 is the preferred embodiment of digital circuitry for controlling switches 15 and 16. Other circuitry will be evident to those skilled in the art.

As mentioned briefly hereinbefore, switching logic 17 consists of a pair of D-type flip-flops 21 and 22, each having a clock input C, a reset input R, an input D, and complimentary outputs Q and $\bar{Q}$. In the operation of such a flip-flop, a positive-going transition at the C input causes the Q output to assume whatever state is then applied to the D input. The Q output of flip-flop 21 is applied to the D input of flip-flop 22 and to switch 16. The $\bar{Q}$ output of flip-flop 21 is applied to the D input thereof and to switch 15.

Counter 18 may be a multiple-stage counter or a plurality of cascaded counters having a count input C, a load input L, and multiple inputs A through n for receiving a preset count. The clock pulses from clock 19 are applied to the C input of counter 18 and to the R input of flip-flop 22. In the present embodiment, the output of counter 18, on a line 27, is normally high except when the maximum count is reached and the clock input goes low. At this time, the output of counter 18 goes low and this signal on line 27 is applied to the C inputs of flip-flops 21 and 22. The $\bar{Q}$ output of flip-flop 22 is applied to the load input terminal L of counter 18. When the $\bar{Q}$ output of flip-flop 22 goes low, counter 18 is loaded to whatever preset count is applied by lines 28 to the preset input terminals A through n.

The operation of controller 10 will be described with regard to the waveforms of FIG. 2 wherein waveform (a) shows the output of clock 19, line (b) indicates the count in counter 18, waveform (c) shows the output of counter 18 on line 27, waveform (d) shows the Q output of flip-flop 21, waveform (e) shows the $\bar{Q}$ output of flip-flop 21, and waveform (f) shows the $\bar{Q}$ output of flip-flop 22.

While switching logic 17 and counter 18 may be implemented to control the alternate switching of switches 15 and 16 in a variety of different ways, the embodiment shown is the preferred embodiment because of its simplicity and because of the minimum number of elements required. In explaining the operation of controller 10, it will be assumed that resistor 11 is a 1,000 ohm resistor and that the resistance of variable resistor 12 is always greater than 1,000 ohms. This means that in order for the average voltages across resistors 11 and 12 to be equal, the current from source 13 will always be conducted through resistor 12 for less time than it will be conducted through resistor 11. This being the case, controller 10 operates such that the closed time of switch 15 on alternate cycles remains constant and switching logic 17 and counter 18 merely adjust the closed time of switch 16. This is implemented through counter 18.

By way of example, counter 18 implements a single, presetable, count-to-999 circuit. Counter 18 is clocked at a 2 MHz rate and generates an output pulse at each 999-to-0 overflow. As will be explained more fully hereinafter, this pulse is used to clock flip-flops 21 and 22 which in turn control counter 18 such that on alternate counter overflows, the signals at the preset count inputs are loaded into counter 18. Thus, on a first cycle, counter 18 counts from 0 to 999, during which time switch 15 is closed and switch 16 is open. When counter 18 overflows, the preset count is loaded into counter 18, counter 18 counts from the preset number to 999, during which time switch 16 is closed and switch 15 is open. When counter 18 again overflows, the cycle repeats indefinitely. Flip-flop 21 alternates its output state on each overflow so that the duty cycle of its outputs Q and $\overline{Q}$ correspond to the alternating different counts. Flip-flop 21 controls switches 15 and 16 so that one switch is always closed and the switches alternate, corresponding to the different count lengths.

Figure 2:
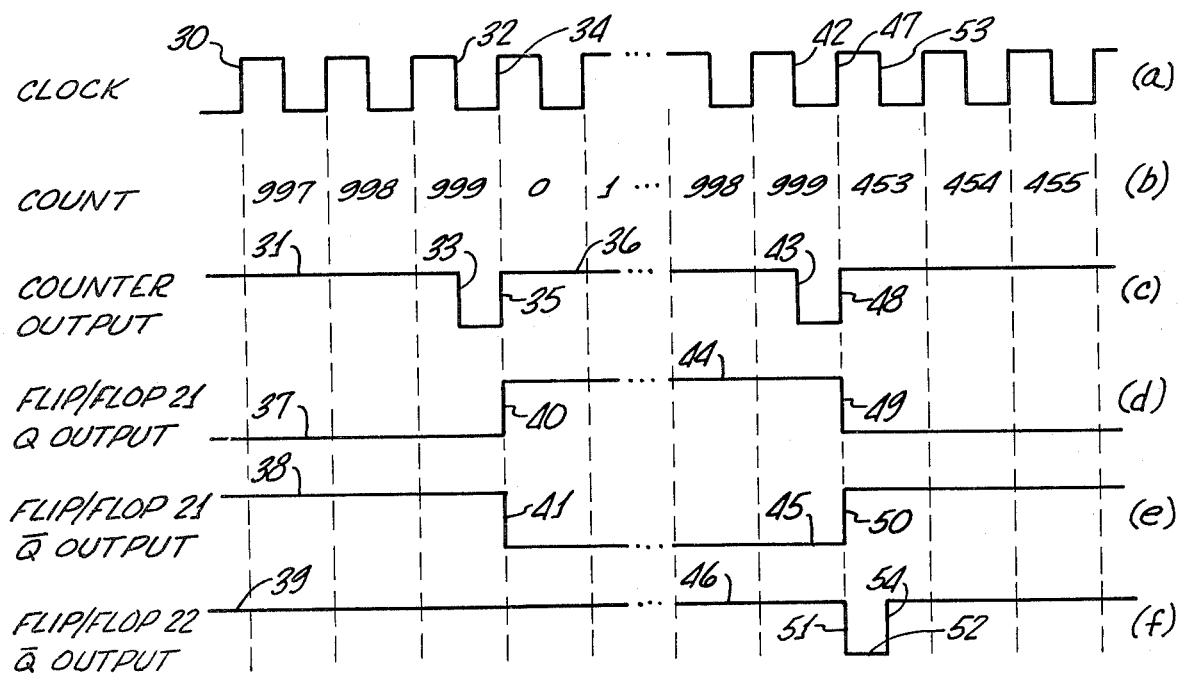
FIG. 2 is a series of waveforms useful in explaining the operation of the controller of FIG. 1.

More specifically, the output of clock 19 is shown at 30 in FIG. 2, waveform (a), and the corresponding count is shown in line (b). As mentioned previously, the output of counter 18 is always high, as shown at 31, except when the clock signal goes low during the count of 999. Thus, when the clock signal goes low, as shown at 32, the output of counter 18 goes low, as shown at 33, and stays low until the clock signal goes high, as shown at 34. At this time, the output of counter 18 goes high, as shown at 35, and stays high, as shown at 36, until the cycle repeats.

When controller 10 is first turned on, the output of flip-flop 21 could have either of two stable states. Assume, for the purpose of example, that at the initial time shown in FIG. 2, the Q output of flip-flop 21 is low, as shown at 37, and the $\overline{Q}$ output of flip-flop 21 is high, as shown at 38. Also assume that the $\overline{Q}$ output of flip-flop 22 is high, as shown at 39. Flip-flops 21 and 22 operate such that they are triggered by a positive-going transition at their clock input terminals C. Thus, when the output of counter 18 goes high, at 35, the Q output of flip-flop 21 will assume the state then appearing at the D input thereof. Since the D input is connected to the $\overline{Q}$ output and the $\overline{Q}$ output is, at this time, high, as shown at 38, the Q output of flip-flop 21 goes high, as shown at 40, and the $\overline{Q}$ output goes low, as shown at 41. Because of the selected implementation of switches 15 and 16, when the Q output of flip-flop 21 goes high, switch 16 is open and when the $\overline{Q}$ output of 21 goes low, switch 15 is closed. Thus, at this time, current source 13 is connected to resistor 11.

Considering now flip-flop 22, when the output of counter 18 goes high, at 35, the Q output of flip-flop 21 is low and this signal is applied to the D input of flip-flop 22. Therefore, the Q output of flip-flop 22 (not shown) goes low and the $\overline{Q}$ output goes high. Since we have assumed, for purposes of example, that the $\overline{Q}$ output of flip-flop 22 is high, as shown at 39, there is no change in the $\overline{Q}$ output at this time. Since the selected implementation of counter 18 is such that the preset count input on lines 28 is loaded into counter 18 only when a low input is applied to the L input terminal thereof, there is no preloading of counter 18 at this time. Therefore, counter 18 overflows to a zero count and the count proceeds.

Counter 18 will again count to 999, from zero, during which time current source 13 is connected via switch 15 to resistor 11. When the clock goes low at a 999 count, as shown at 42, the output of counter 18 goes low, as shown at 43. At this time, the Q output of flip-flop 21 is high, as shown at 44, the $\overline{Q}$ output of flip-flop 21 is low, as shown at 45, and the $\overline{Q}$ output of flip-flop 22 is high, as shown at 46. When the clock signal next goes high, as shown at 47, at the end of the 999 count, the output of counter 18 goes high, as shown at 48. At this time, since the Q output of flip-flop 21 follows the D input and the D input is low, the Q output of flip-flop 21 goes low, as shown at 49, and the $\overline{Q}$ output of flip-flop 21 goes high, as shown at 50. This closes switch 16 and opens switch 15. Since, at this time, the high signal at the Q output of flip-flop 21 is applied to the D input of flip-flop 22, when the output of counter 18 goes high, at 48, the $\overline{Q}$ output of flip-flop 22 goes low, as shown at 51. This occurs simultaneously with the transitions of flip-flop 21, shown at 49 and 50.

Since a low signal, as shown at 52, is now applied to the load input terminal L of counter 18, the preset count at input terminals 28 is now loaded into counter 18 and counter 18 immediately assumes the preset count, shown as the count "453" in the present embodiment. The manner in which this count is selected will be described more fully hereinafter. In any event, when the clock signal again goes low, as shown at 53, a reset signal is applied to the R input of flip-flop 22, causing the Q output to go low and the $\overline{Q}$ output to go high, as shown at 54. This removes the load input from counter 18 and permits counter 18 to count clock pulses beginning at the preset count.

It will be noted that at this time, the conditions are as they were originally assumed to be. Thus, the output of counter 18 goes low for one half count at each 999 count, at which time flip-flop 21 changes state. On alternate changes in state of flip-flop 21, the $\overline{Q}$ output of flip-flop 22 goes low for a half count, loading the preset count into counter 18.

The resultant voltage pulses appearing across reference resistor 11 and variable resistor 12 are filtered by filters 23 and 24 and then differentially amplified by amplifier 25 to produce an error signal on line 26. By way of example, for a temperature control system, where the resistance versus temperature characteristics of thermistor 12 are known, the preset count is loaded so that if the temperature is correct, the resistance of resistor 12 will be such that the average voltages across resistors 11 and 12 will be equal and the error signal will be zero. If the temperature is incorrect and the resistance value of resistance 12 is other than that desired, there will be a difference in the average voltages, resulting in a finite error signal on line 26. This error signal could then be further processed to drive a heater and/or a cooler which would in turn change the temperature of the mass or material whose temperature is being sensed by thermistor 12.

Considering the specific embodiment shown and the numbers used, the preset count which should be entered into counter 18 is given by the equation $$\text{in}' = 1000 - (10^6/R_v) \tag{1}$$

where n' is the preset number and $R_v$ is the known resistance of resistor 12 at the desired temperature. This equation is derived as follows:

If a current I through a resistance R is periodically switched on and off, with a total period T and with an "on" time $t_1$ during each period T, then the average voltage $\overline{V}$ across the resistance is given by the equation $$\overline{V} = IR\,(t_1/T) \tag{2}$$

In the present case, we have two resistances generally designated $R_1$ and $R_2$ and a current I periodically switched back and forth. If the current I is switched through $R_1$ for a time $t_1$ and through $R_2$ for a time $t_2$, again with a total switching period T, where $t_1+t_2=T$, then $$\overline{V}_2=IR_2(t_2/T) \text{ and } \overline{V}_1=IR_1(t_1/T) \quad (3)$$

where $\overline{V}_1$ and $\overline{V}_2$ are the respective average voltages across $R_1$ and $R_2$. To make these voltages equal, the resistances and times must be such that $$\overline{V}_1=IR_1(t_1/T=\overline{V}_2=IR_2(t_2/T), \text{ or}$$

$$(I/T)R_1t_1 =(I/T)R_2t_2, \text{ or}$$

$$R_1t_1=R_2t_2, \text{ or}$$

$$t_2=(R_1/R_2)t_1 \quad (4)$$

For the specific example given, let $R_1$ be the 1,000 ohm reference resistor $R_f$ and $R_2$ be the variable resistor $R_v$. In each current switching cycle, the time that I is switched through $R_f$ is always 1,000 counts of the 2 MHz clock period, denoted $t_c$, so that $$t_1=1000t_c. \quad (5)$$

For the average votage across $R_f$ to equal the average voltage across $R_v$, equation (4) must be satisfied, i.e.

$$t_2=(R_f/R_v)(1000t_c). \quad (6)$$

Since $t_2$ will also be determined by some number n of counts of the 2 MHz clock, $t_2$ may be written as $$t_2=nt_c. \quad (7)$$

Combining equations (6) and (7), $$t_2=nt_c=(R_f/R_v)(1000t_c), \text{ or}$$

$$n=(R_f/R_v)1000. \quad (8)$$

To make the average voltages $\overline{V}_1$ and $\overline{V}_2$ equal, I is switched through $R_f$ for 1,000 counts and through $R_v$ for n counts. To get n counts though, counter 18 must count up from some preload number n' to 1,000, so that $$n=1000-n', \text{ or}$$

$$n'=1000-n. \quad (9)$$

Combining equations 8 and 9, $$n'=1000-(R_f/R_v)1000. \quad (10)$$

Since $R_f=1000$ ohms, $$n'=1000-(10^6/R_v). \quad (11)$$

It can therefore be seen that according to the present invention, there is provided a simple and inexpensive controller 10 which may be utilized to control any physical parameter which can be related to a resistance value. Controller 10 generates an error signal proportional to the difference between a desired value of the physical parameter and the actual value of the physical parameter. Controller 10 does not require initial or subsequent calibration or adjustment and this is true during initial manufacture as well as during the life thereof. That is, if resistors 11 and 12 are precision resistors, the circuit is insensitive to changes within the circuit. In other words, if current source 13 were to drift, it would not affect the output since the same current is conducted through the two resistors and the average voltages will change by the same amounts. As mentioned previously, it is only necessary that the current not drift too rapidly. Similarily, if clock 19 has its frequency change, this will not affect the average value, as long as the change does not occur too rapidly.

Of particular importance in today's instrument designs incorporating microprocessors and other digital circuitry, the present controller is digitally programmable. Controller 10 may be easily programmed by presenting a BCD code at the input of counter 18. For the specific resistors 11 and 12 described herein, the preset number is used by determining the answer to equation 11.

While the invention has been described with respect to the preferred physical embodiment constructed in accordance therewith, it will be apparent to those skilled in the art that various modifications and improvements may be made without departing from the scrope and spirit of the invention. Accordingly, it is to be understood that the invention is not to be limited by the specific illustrative embodiment, but only by the scope of the appended claims.

I claim:

1. A programmable controller for generating a signal for controlling the value of a physical parameter comprising:
    a fixed reference resistor;
    a variable resistor, the resistance value of which changes as a function of the value of said physical parameter;
    a source of current;
    means for switching said current alternately through said fixed and variable resistors;
    means for controlling said switching means to adjust the relative times said current is conducted through said resistors, said relative times being a function of a desired value of said physical parameter; and
    means for determining the difference between the average voltages across said resistors and for generating a control signal proportional thereto.

2. A programmable controller according to claim 1, wherein said physical parameter is temperature and said variable resistor is a thermistor.

3. A programmable controller according to claim 1, wherein said controlling means comprises:
    a source of clock pulses; and
    counting means responsive to said clock pulses for counting same, said counting means controlling the time when said current is alternated between said fixed and variable resistors, said counting means being programmable to adjust the relative times said current is conducted through said resistors.

4. A programmable controller according to claim 3, wherein said controlling means further comprises:
    logic means responsive to the count in said counting means for signaling said switching means to alternate said current through said fixed and variable resistors, said counting means signaling said logic means upon reaching a predetermined count, said counting means being programmable to adjust the time at which said predetermined count is reached to alternate cycles of said switching means.

5. A programmable controller according to claim 1, wherein said difference determining means comprises:

low pass filter means operatively connected to said fixed and variable resistors for generating first and second signals as a function of the average voltages thereacross; and means responsive to said first and second signals for generating said control signal as a function of the difference therebetween.

6. A programmable controller according to claims 1, 2, 3, 4, or 5, wherein said controlling means controls said switching means so that the average voltage generated across said variable resistor will be equal to the average voltage generated across said fixed resistor if said physical parameter has said desired value whereby said control signal is proportional to the difference between said desired value of said physical parameter and the actual value of said physical parameter.

7. A circuit for generating an output as a function of the difference between the actual resistance of a first resistance element and a desired resistance of said first resistance element comprising:

first and second resistance elements;

a source of current;

means for alternately conducting said current through said first and second resistance elements;

means for controlling said conducting means to adjust the relative times said current is conducted through said resistance elements so that the average voltage generated across said resistance elements will be equal if said actual resistance of said first resistance element equals said desired resistance of said first resistance element; and means for generating said output as a function of the difference between the average voltages across said resistance elements.

8. A circuit according to claim 7, wherein said controlling means comprises:

a source of clock pulses; and counting means responsive to said clock pulses for counting same, said counting means controlling the time when said current is alternated between said resistance elements, said counting means being programmable to adjust the relative times said current is conducted through said resistance elements.

9. A circuit according to claim 8, wherein said controlling means further comprises:

logic means responsive to the count in said counting means for signaling said conducting means to alternate said current through said resistance elements, said counting means signaling said logic means upon reaching a predetermined count, said counting means being programmable to adjust the time at which said predetermined count is reached on alternate cycles of said conducting means.

* * * * *